S. T. ALLEN.
PISTON RING.
APPLICATION FILED AUG. 28, 1916.
1,237,853.
Patented Aug. 21, 1917.
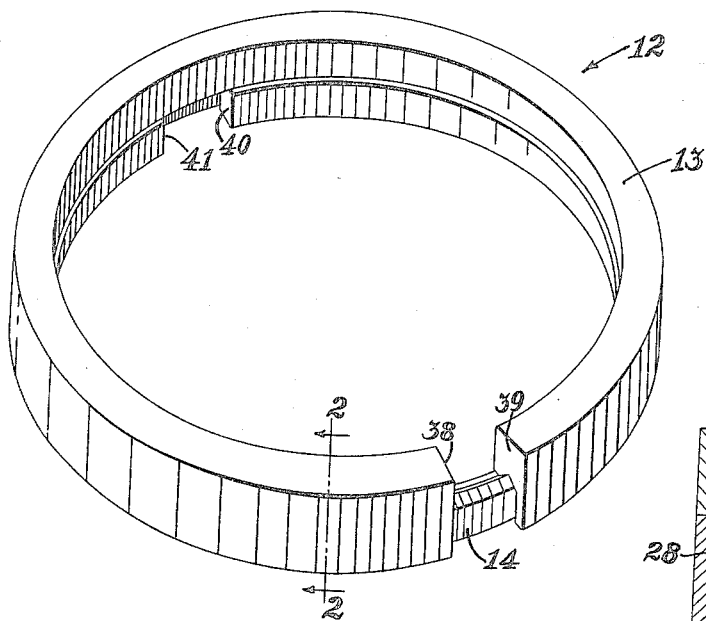
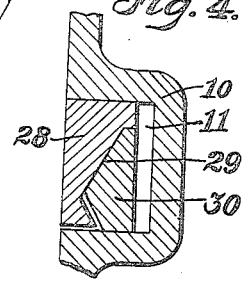
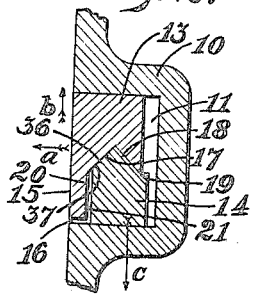
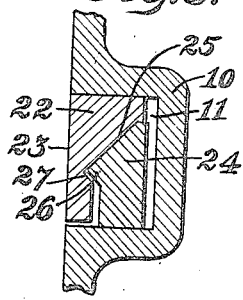
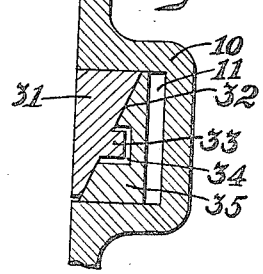
INVENTOR
Sherman T. Allen
BY Hazard Berry & Miller
ATTY'S.

UNITED STATES PATENT OFFICE.

SHERMAN T. ALLEN, OF LOS ANGELES, CALIFORNIA.

PISTON-RING.

1,237,853.            Specification of Letters Patent.      Patented Aug. 21, 1917.

Application filed August 28, 1916. Serial No. 117,300.

*To all whom it may concern:*

Be it known that I, SHERMAN T. ALLEN, a citizen of the United States, residing at Los Angeles, in the county of Los Angeles and State of California, have invented new and useful Improvements in Piston-Rings, of which the following is a specification.

This invention relates to a piston ring.

It is an object of this invention to provide a piston ring with positive acting means for insuring that contact will be maintained between the ring and the cylinder within which it moves.

Another object is to provide a ring which will at all times be in intimate contact with the side walls of the piston ring groove.

It is an object to provide a piston ring having a wearing surface of a suitable metal and slight resiliency and means possessing greater resiliency mounted within the piston ring and adapted to produce an outward pressure against the wear ring.

Another object is to produce a two-piece piston ring which may be readily assembled and easily mounted in position upon a piston.

A further object is to produce a piston ring which is substantially leak proof and which may be manufactured without difficulty and at small cost.

Other objects will appear hereinafter.

The invention is illustrated in the accompanying drawings in which:

Figure 1 is a view in perspective of my piston ring and shows it as partially expanded.

Fig. 2 is a view in vertical section as seen on the line 2—2 of Fig. 1 and showing the correlation between the two elements of the ring.

Fig. 3 is a view in vertical section similar to Fig. 2 and illustrates a modified form of my invention.

Fig. 4 is a view in vertical section of a modified form of my improved piston ring.

Fig. 5 is a view in vertical section of another modified form of my invention.

Referring to the drawings, 10 indicates a portion of an engine piston which is formed with piston ring grooves 11. The grooves 11 are of common construction and dimensions and have mounted within them piston rings 12. Referring particularly to Figs. 1 and 2 which illustrate the preferred form of my invention, it will be seen that the ring 12 consists of an outer ring 13 and an inner ring 14. The outer ring is preferably formed of some metal which wears well. In this instance I have used cast iron for the outer ring as its wearing qualities are very desirable. The cast iron ring is formed with a bearing face 15 which extends the full width of the ring and approximately the width of the groove 11. A slight amount of variation in the width of the face 15 and the groove 11 is allowed as indicated at 16. Formed approximately mid-way the width of the ring and adjacent its outer wall is a V-shaped channel 17 which is disposed with its gullet extending downwardly.

The channel 17 formed upon the outer ring member 13 is adapted to provide a seat for the inner ring member 14. This member has a V-shaped extension 18 upon its upper face, said extension being adapted to register with the V-shaped groove 17, the faces of which are formed with complementary angles. A shoulder 19 is formed upon the same upper face and adjacent the V-shaped extension. It will be noted that the lateral distance from the center of the V-shaped extension to its outer face is less than the distance from the center of the V-shaped groove to the wall 20 of the ring 13. This variation in distance allows a space 21 to occur between the two rings for a purpose which will hereafter be described. The ring 14 is constructed so that it will possess greater resiliency than the outer ring 13, said resiliency acting to expand both rings and accomplishing the result to be obtained by this invention.

Reference being had to Fig. 3, it will be seen that the inner ring 22 is provided with a bearing surface 23 similar to the preceding ring. The resilient ring 24, however, engages with the ring 22 along a single angular plane 25 and is held by means of the projection 26 which engages a recess 27 formed upon the ring 22.

Fig. 4 is another modified form of this invention and consists of a wear ring 28 formed with a vertically extending angular groove 29 upon its inner side within which an expansion ring 30 is adapted to rest.

The modification shown in Fig. 5 consists of a wear ring 31 having its inner face formed at an angle to the vertical, as indicated at 32, an annular ring 33 being formed approximately mid-way the length of said angular face. A channel 34 is formed within the outer face of the expansion ring 35 and in register with the annular ring portion 33.

When this piston ring is mounted within the piston ring channel 11, as indicated in Fig. 2, the ring 14 which is an expansion ring and which may be preferably made of steel, expands outwardly, its angular face 36 acting upon the face 37 of the groove 17 in a wedge fashion. This action will cause the wearing ring 13 to move outwardly in the direction of the arrow —a— as well as upwardly in the direction of the arrow —b—. This will exert a force against the wall of the engine cylinder and wedge the piston ring against the upper wall of the piston ring groove 11. Simultaneous with this action, the ring 14 will be wedged downwardly, as indicated by the arrow —c— against the opposite wall of the groove 11. In this manner positive contact will be had between the piston ring and the cylinder wall and an effectual seal will be had to prevent leakage between the marginal edges of the piston ring and the piston ring groove 11, the only leakage possible being that which might occur between the abutting ends 38 and 39 of the outer ring 13 and the ends 40 and 41 of the inner ring 14.

The action of the piston rings illustrated in the modified forms shown in Figs. 3, 4 and 5 is identical with that of the preferred form of the invention, that is, the complementary wedge faces of the wear rings and the expansion rings all act to expand the piston ring betwen the opposite walls of the piston ring groove and to move it outwardly against the wall of the cylinder.

In assembling these rings, the preferred form of ring may be readily assembled by slipping the inner ring into place within the groove 17 of the outer ring. This operation is accomplished upon this ring without difficulty. It will be noted, however, that in the modified forms of the ring the inner ring must need be snapped into place due to the variance in the diameters of the adjacent parts. When either of the rings is in its assembled position it will remain as a unit due to the expansive efforts of the inner ring.

It will thus be seen that I have provided a piston ring which in a simple manner insures that the ring will have positive bearing against the cylinder wall and that leakage will not take place around the ring and through the piston groove 11 and further that the ring may be provided with a bearing surface of great wearing qualities.

I claim:

1. A piston ring, comprising an outer wear ring adapted to bear with its periphery upon the surface of a cylinder and to be mounted within a ring groove upon a piston, an expansion ring positioned within the piston groove and adapted to be circumscribed by said outer ring, means whereby the two rings will act to expand outwardly against the wall of the cylinder and oppositely against the transverse walls of the piston ring groove, and means whereby the rings will be interlocked to maintain them in their assembled condition.

2. A piston ring, comprising an outer wear ring adapted to bear with its periphery upon the surface of a cylinder and to be mounted within a piston groove in a manner to prevent one of its flat faces to bear against the side of said groove, an expansion ring positioned within said piston ring and adapted to bear with its outer face against the inner face of the wear ring and with its lower flat face against the lower side wall of the ring groove, inclined planes formed by the adjacent bearing faces of the expansion and wear rings whereby the rings will expand outwardly against the cylinder wall and oppositely against the walls of the ring groove, and means formed throughout the circumference of said inclined faces whereby the rings will be held in their assembled position.

In testimony whereof I have signed my name to this specification.

SHERMAN T. ALLEN.